TEMPERATURE COMPENSATION OF CRYSTAL-CONTROLLED CIRCUIT

Filed July 18, 1967

INVENTOR:
ANTON W. MERDIAN, JR.

BY Norman C. Fulmer
HIS ATTORNEY.

United States Patent Office 3,457,529

Patented July 22, 1969

3,457,529

TEMPERATURE COMPENSATION OF CRYSTAL-CONTROLLED CIRCUIT

Anton W. Merdian, Jr., Mexico, N.Y., assignor to General Electric Company, a corporation of New York Filed July 18, 1967, Ser. No. 654,226

Int. Cl. H01p *1/30, 7/00;* H03j *3/04*

U.S. Cl. 333—82 3 Claims

ABSTRACT OF THE DISCLOSURE

An improved temperature compensation circuit is disclosed for use with crystal-controlled circuits such as oscillators and frequency filters. One or more thermistor devices are connected to an inductance of the crystal-controlled circuit in a manner to stabilize the frequency of the circuit with respect to temperature variation.

The invention herein described was made in the course of or under contract or subcontract thereunder, with the United States Army.

Background of the invention

Piezolectric crystals are frequently employed in oscillators and filter circuits where operation is desired at a particular frequency as determined by the crystal. The frequency of the crystal varies somewhat with temperature, in various ways and degrees depending upon the type of crystal. In certain crystal-controlled circuits it is desirable to improve the frequency stability with respect to temperature. One well-known way to achieve this frequency stabilization is to place the crystal in a temperature-controlled oven which maintains the crystal at a constant operating temperature irrespective of changes in the ambient temperature. The oven temperature may be controled by a heater element operated by means of one or more bimetal temperature-sensitive switches.

Another known way of achieving freqency stabilization with respect to temperature, is to provide one or more compensating capacitors in the crystal-controlled circuit, these capacitors being selectively connected into the circuit or otherwise controlled by means of bimetal switches or by thermistors (temperature-sensitive resistors; the resistance varies with temperature) in a manner to compensate for frequency variation of the crystal and thereby stabilize the frequency of the circuit with respect to temperature .

The above-described frequency stabilizing arrangements have certain disadvantages. The temperature-controlled crystal oven is bulky, expensive, consumes power, requires a warm-up time before it is effective, and tends to be undesirably slow in responding to ambient temperature changes. The capacitance compensation arrangement requires the addition to the circuit of special capacitors having temperature characteristics that are stable or which vary in a consistent known manner.

Summary of the invention

Objects of the invention are to provide a new and improved arrangement for stabilizing the frequency of a crystal-controlled circuit, with respect to temperature, and to solve the prior-art problems described above.

The invention comprises, briefly and in a preferred embodiment, a crystal-controlled circuit having a resonant circuit including an inductance connected to be resonated by a crystal-controlled signal, and a thermistor device connected electrically across at least a portion of the inductance, the thermistor device having a resistance vs. temperature characteristic for varying the inductance to compensate for variation of the crystal frequency with respect to temperature. In accordance with a feature of the invention, two or more thermistors are connected electrically across different portions of the inductance and have different characteristics of resistance vs. temperature for achieving frequency compensation over different temperature ranges. Preferably, one thermistor functions to decrease the inductance value at relatively high temperatures and another thermistor functions to increase the inductance value at relatively low temperatures.

Description of the preferred embodiment

Figure 1:
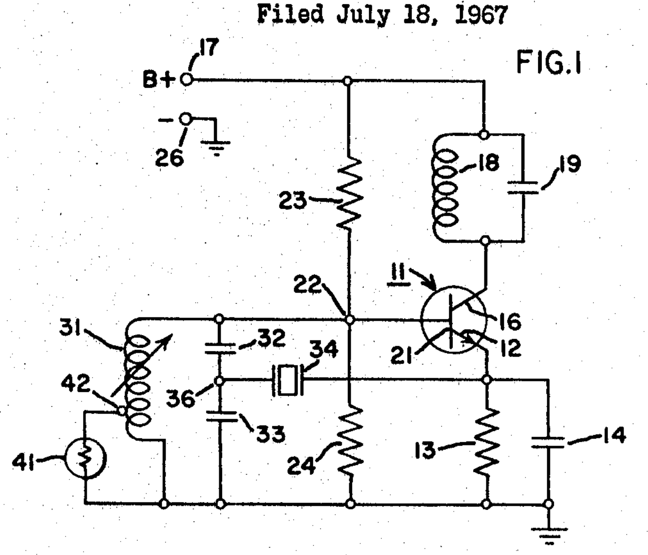
FIGURE 1 is an electrical schematic diagram of a preferred embodiment of the invention.

In the circuit of FIGURE 1, a transistor 11 has an emitter electrode 12 connected to electrical ground via a biasing network comprising a resistor 13 and capacitor 14 connected in parallel, and a collector electrode 16 connected to a terminal 17 of operating voltage via a resonant circuit comprising an inductor 18 and capacitance 19 connected in parallel. A base electrode 21 is connected to the junction 22 of a pair of resistors 23 and 24 which are connected in series between the operating voltage terminal 17 and electrical ground. A second operating voltage terminal 26 provides an electrical ground return connection for the voltage source. An inductor 31 is connected between the base electrode 21 and electrical ground, and a pair of capacitors 32 and 33 are connected in series across the inductor 31. A piezoelectric crystal 34 is connected between the emitter electrode 12 and the junction 36 of the capacitors 32 and 33.

FIGURE 1 is an oscillator circuit of the Colpitts type, with crystal control of the oscillation frequency. In accordance with the invention, a thermistor 41 is connected across a portion of the inductors 31, by being connected between a tap 42 and electrical ground. The thermistor 41 is of the type having a relatively high resistance at lower temperatures, and having a lower resistance at higher temperatures, so that at higher temperatures the thermistor 41 partially shorts out the portion of the inductor 31 across which it is connected, thereby reducing the inductance value and increasing the resonant frequency of the circuit in a manner to compensate for the decrease in resonant frequency of the crystal 34 which occurs at higher temperatures.

Figure 2:
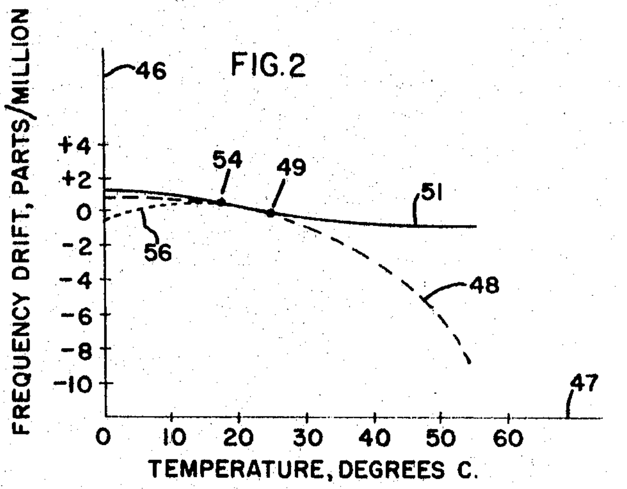
FIGURE 2 is a plot of frequency drift versus temperature, illustrating operation of the invention.

The foregoing will be more clear with reference to FIGURE 2, in which the vertical axis 46 represents frequency drift in parts per million, and the horizontal axis 47 represents temperature in degrees centigrade. The dashed line curve 48 represents the frequency drift versus temperature for the oscillator circuit of FIGURE 1, with the thermistor 41 omitted. Since the frequency drift becomes serious at temperatures greater than point 49 on the curve 48, a thermistor 41 is chosen having the characteristic of high resistance at temperatures below that of point 49, and decreasing resistance at temperatures greater than that of point 49. From the formula $$\frac{\Delta f}{\Delta L} = \frac{-L^{-3/2}}{4\pi\sqrt{C}}$$

which applies to this circuit, where $\Delta f$ is the frequency change (in cycles per second) due to the inductance change $\Delta L$ (in henries); L is the inductance (in henries) of the inductor 31; and C is the total capacitance (in farads) of the series connected capacitors 32 and 33, it is seen that $\Delta L$ must follow an inverse three-halves power curve to frequency-compensate for the oscillator's temperature drift. This is approximately the curve of a thermistor's resistance versus temperature characteristic. The optimum thermistor can be calculated from $$R_T = X_{\Delta L}$$

where $R_T$ is the thermistor resistance (in ohms) at the temperature specified by the knee of the curve of oscillator frequency versus temperature, i.e. the point 49, and $X_{\Delta L}$ is the reactance (in ohms) at the value of $\Delta L$. The desired thermistor characteristics can also be determined in other ways, for example from inspection of the oscillator temperature curve 48, or by experimenting with various thermistors or values of resistance.

With the thermistor 41 connected in the circuit, in accordance with the invention, the frequency versus temperature characteristic becomes substantially stabilized, as indicated by the solid line curve 51 in FIGURE 2.

Figure 3:
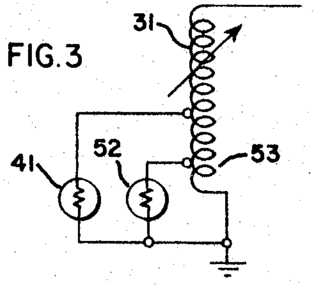
FIGURE 3 is an electrical schematic diagram showing a modification of a portion of the circuit of FIGURE 1.

In accordance with a further feature of the invention, greater stabilization can be achieved by connecting a second thermistor 52 across a portion of the inductor 31, as shown in FIGURE 3. The thermistor 52 is a type having a relatively lower resistance at relatively higher temperatures, so as to substantially short-circuit the lower portion 53 of the inductor 31 at temperatures higher than that indicated by point 54 in FIGURE 2. At temperatures below that indicated by point 54, however, the thermistor 52 has a relatively high resistance, so that the portion 53 of the inductor becomes effective thereby increasing the total inductance of the inductor 31 at temperatures below that indicated by point 54 in FIGURE 2, so that the frequency versus temperature characteristic curve of the circuit at temperatures below that of point 54 follows the dotted line curve 56 which, it will be seen, renders the overall frequency characteristic curve quite stable with respect to temperature.

In the embodiment shown in FIGURE 3, the portion of inductance 53 across which the second thermistor 52 is connected, consists of some additional turns added to the inductor 31, so as not to affect the normal inductance of inductor 31 in the medium and higher temperature operating ranges.

As has been shown with reference to FIGURE 2, the invention achieves its objective of providing improved stabilization of a crystal-controlled circuit, and this is achieved in a simple, inexpensive, compact, and reliable manner by the employment of one or more thermistors in the manner shown and described.

While preferred embodiments of the invention have been shown and described, various other embodiments and modifications thereof will be apparent to persons skilled in the art, and will fall within the scope of invention as defined in the following claims.

I claim:

1. A crystal-controlled circuit having a piezoelectric crystal resonant at a given frequency and a capacitor-inductor circuit resonant at substantially said given frequency and electrically coupled to said crystal, said crystal having a characteristic of variation of resonant frequency with respect to temperature, wherein the improvement comprises a plurality of thermistor devices each connected electrically across at least a portion of said inductor, a first one of said thermistor devices having a resistance vs. temperature characteristic for varying the inductance to provide partial compensation for the variation of crystal frequency with respect to temperature, each of the additional said thermistor devices having characteristics of resistance vs. temperature so as to vary the inductance of said inductor with respect to temperature in a manner to provide improved compensation for the crystal frequency variation with respect to temperature over that provided by said first thermistor device.

2. A circuit as claimed in claim 1, in which said crystal variation of resonant frequency with respect to temperature is relatively greater and in a downward direction at temperatures above a knee of the frequency variation vs. temperature characteristic curve than below said knee, said first thermistor device having the characteristic of a resistance that is relatively great at temperatures lower than that corresponding to said knee of the characteristic curve and which decreases at temperatures greater than that corresponding to said knee, one of said additional thermistor devices being connected across a portion of said inductor and having a characteristic of resistance vs. temperature that varies in the opposite direciton from that of the first thermistor device, the resistance of said additional thermistor device being relatively great at temperatures above a point on said crystal characteristic curve that corresponds to a temperature lower than that of said knee of the curve, and said last-named characteristic resistance becoming relatively less at temperatures less than that corresponding to said point on the crystal characteristic curve.

3. A circuit as claimed in claim 2, in which said portion of the inductor across which said additional thermistor device is connected comprises additional turns added to the inductor, said additional turns being substantially electrically short-circuited by said additional thermistor device at temperatures greater than that corresponding to said point on the crystal characteristic curve.

References Cited

FOREIGN PATENTS

| | | |
|---|---|---|
| 1,060,922 | 7/1959 | Germany. |
| 552,431 | 4/1943 | Great Britain. |

OTHER REFERENCES

Electronics, "Frequency Standard Uses Transistors," June 12, 1959, p. 76.

JOHN KOMINSKI, Primary Examiner

U.S. Cl. X.R.

310—8.1; 331—116, 176; 333—72; 334—5